United States Patent
Watkins et al.

(10) Patent No.: US 10,253,149 B2
(45) Date of Patent: Apr. 9, 2019

(54) ARTICLE WITH CONTROLLED CUSHIONING

(71) Applicant: NIKE, Inc., Beaverton, OR (US)

(72) Inventors: Richard L. Watkins, Portland, OR (US); Hossein Baghdadi, Portland, OR (US); Charles Edwards, Portland, OR (US); Yihua Chang, Portland, OR (US)

(73) Assignee: Nike, Inc., Beaverton, OR (US)

( * ) Notice: Subject to any disclaimer, the term of this patent is extended or adjusted under 35 U.S.C. 154(b) by 0 days.

(21) Appl. No.: 14/971,752

(22) Filed: Dec. 16, 2015

(65) Prior Publication Data
US 2016/0108198 A1    Apr. 21, 2016

Related U.S. Application Data

(63) Continuation of application No. 13/838,836, filed on Mar. 15, 2013, now Pat. No. 9,243,104.

(51) Int. Cl.
*C08J 9/00* (2006.01)
*C08J 9/12* (2006.01)
(Continued)

(52) U.S. Cl.
CPC .............. *C08J 9/00* (2013.01); *A43B 13/125* (2013.01); *A43B 13/16* (2013.01); *A43B 13/188* (2013.01);
(Continued)

(58) Field of Classification Search
CPC .......................... B29D 35/0054–35/009; B29D 35/065–35/068; B29D 35/12–35/148; B29D 44/0461–44/0476
See application file for complete search history.

(56) References Cited

U.S. PATENT DOCUMENTS

| 4,171,411 A | 10/1979 | Ehrenfreund |
| 4,418,483 A | 12/1983 | Fujita et al. |

(Continued)

FOREIGN PATENT DOCUMENTS

| EP | 1266928 A1 * | 12/2002 | ........... B29C 44/348 |
| EP | 2649896 | 10/2013 | |

(Continued)

OTHER PUBLICATIONS

PCT International Search Report and Written Opinion for PCT/US2014/022280 dated Aug. 1, 2014.

(Continued)

*Primary Examiner* — Stephen E Rieth
(74) *Attorney, Agent, or Firm* — Thomas|Horstemeyer, LLP

(57) ABSTRACT

Pellets, beads, particles, or other pieces of a thermoplastic elastomer having a maximum size in at least one dimension of 10 mm or less (collectively, "pellets") are infused with a supercritical fluid in a pressurized container, then rapidly depressurized and heated either by immersion in a heated fluid or with infrared or microwave radiation to foam the pellets The pellets are prepared with at least two different densities. Pellets with different densities, thermoplastic elastomer compositions, or foam response rates are placed in different areas of a mold. The mold is filled with pellets, then the pellets are molded into a part. The part has areas of different density as a result of the placement of pellets of different density.

15 Claims, 1 Drawing Sheet

(51) Int. Cl.
- *A43B 13/12* (2006.01)
- *A43B 13/16* (2006.01)
- *B29C 44/34* (2006.01)
- *B29C 44/44* (2006.01)
- *B29D 35/12* (2010.01)
- *B29D 35/00* (2010.01)
- *C08G 18/82* (2006.01)
- *C08L 75/04* (2006.01)
- *B29C 44/04* (2006.01)
- *C08J 9/18* (2006.01)
- *C08J 9/232* (2006.01)
- *A43B 13/18* (2006.01)
- *C08G 18/06* (2006.01)
- *B29K 75/00* (2006.01)
- *B29K 105/04* (2006.01)

(52) U.S. Cl.
CPC ...... *B29C 44/0461* (2013.01); *B29C 44/3453* (2013.01); *B29C 44/3461* (2013.01); *B29C 44/445* (2013.01); *B29D 35/0054* (2013.01); *B29D 35/122* (2013.01); *C08G 18/06* (2013.01); *C08G 18/82* (2013.01); *C08J 9/009* (2013.01); *C08J 9/122* (2013.01); *C08J 9/18* (2013.01); *C08J 9/232* (2013.01); *C08L 75/04* (2013.01); *B29K 2075/00* (2013.01); *B29K 2105/04* (2013.01); *C08J 2203/06* (2013.01); *C08J 2203/08* (2013.01); *C08J 2300/22* (2013.01); *C08J 2300/26* (2013.01); *C08J 2375/04* (2013.01)

(56) References Cited

U.S. PATENT DOCUMENTS

| | | | |
|---|---|---|---|
| 4,480,054 | A | 10/1984 | Enderle |
| 5,670,102 | A | 9/1997 | Perman et al. |
| 5,789,505 | A | 8/1998 | Wilkinson et al. |
| 6,598,252 | B2 | 7/2003 | Woerlee |
| 6,620,211 | B2 | 9/2003 | Veugelers et al. |
| 6,797,737 | B1 | 9/2004 | Hsu et al. |
| 6,849,667 | B2 * | 2/2005 | Haseyama ............ B29C 44/348 521/130 |
| 6,878,753 | B1 | 4/2005 | Takemura et al. |
| 7,731,763 | B2 | 6/2010 | Fernandez Cid et al. |
| 7,861,733 | B2 | 1/2011 | Pellikaan et al. |
| 7,938,865 | B2 | 5/2011 | Fernandez Cid et al. |
| 9,243,104 | B2 * | 1/2016 | Watkins ................ C08G 18/82 |
| 2002/0045040 | A1 | 4/2002 | Kanada |
| 2004/0041292 | A1 | 3/2004 | Chen et al. |
| 2004/0080070 | A1 | 4/2004 | Liu et al. |
| 2008/0005856 | A1 | 1/2008 | Hung et al. |
| 2010/0052201 | A1 | 3/2010 | Nadella |
| 2010/0222442 | A1 | 9/2010 | Prissok et al. |
| 2011/0047720 | A1 | 3/2011 | Maranan et al. |
| 2011/0138547 | A1 | 6/2011 | Fernandez Cid et al. |
| 2011/0232135 | A1 | 9/2011 | Dean et al. |
| 2011/0275732 | A1 | 11/2011 | Bruchmann et al. |
| 2011/0283560 | A1 | 11/2011 | Portzline et al. |
| 2012/0003457 | A1 | 1/2012 | Hatanaka et al. |
| 2014/0151918 | A1 | 6/2014 | Hartmann |

FOREIGN PATENT DOCUMENTS

| | | | | |
|---|---|---|---|---|
| JP | 10151647 | | 6/1998 | |
| JP | 2008037962 | A | 2/2008 | |
| KR | 1019840000425 | B1 | 4/1984 | |
| KR | 100539131 | B1 * | 12/2005 | ........... B29C 44/348 |
| WO | 9420568 | | 9/1994 | |
| WO | 2012065926 | A1 | 5/2012 | |
| WO | 2013013784 | A1 | 1/2013 | |
| WO | WO-2013013784 | A1 * | 1/2013 | ............ B29D 35/06 |
| WO | 2017000162 | A1 | 1/2017 | |

OTHER PUBLICATIONS

PCT International Preliminary Report on Patentability CHII for PCT Application No. PCT/US2014/022280, dated Jun. 2, 2015, 15 pgs.

LeGrand, D.G. Annealing. Encyclopedia of Polymer Science and Technology. John Wiley and Sons, Inc. Published Online Feb. 15, 2011.

3,5-Dimethyl-1-hexyn-3-ol MSDS. Sigma-Aldrich. Sep. 25, 2013.

Office Action Issued by the Chinese Patent Office for Application 201480015776.9, dated May 27, 2017.

Office Action issued by the USPTO for U.S. Appl. No. 15/297,209, dated Feb. 27, 2018.

European Search Report for Application 17170692.2-1377, dated Jul. 31, 2017.

International Search Report for PCT/US2018/031938 dated Sep. 9, 2018.

Database WPI, Week 200818, Thomson Scientifice, London, GB; AN 2008-C42694, XP002783547, 2008.

* cited by examiner

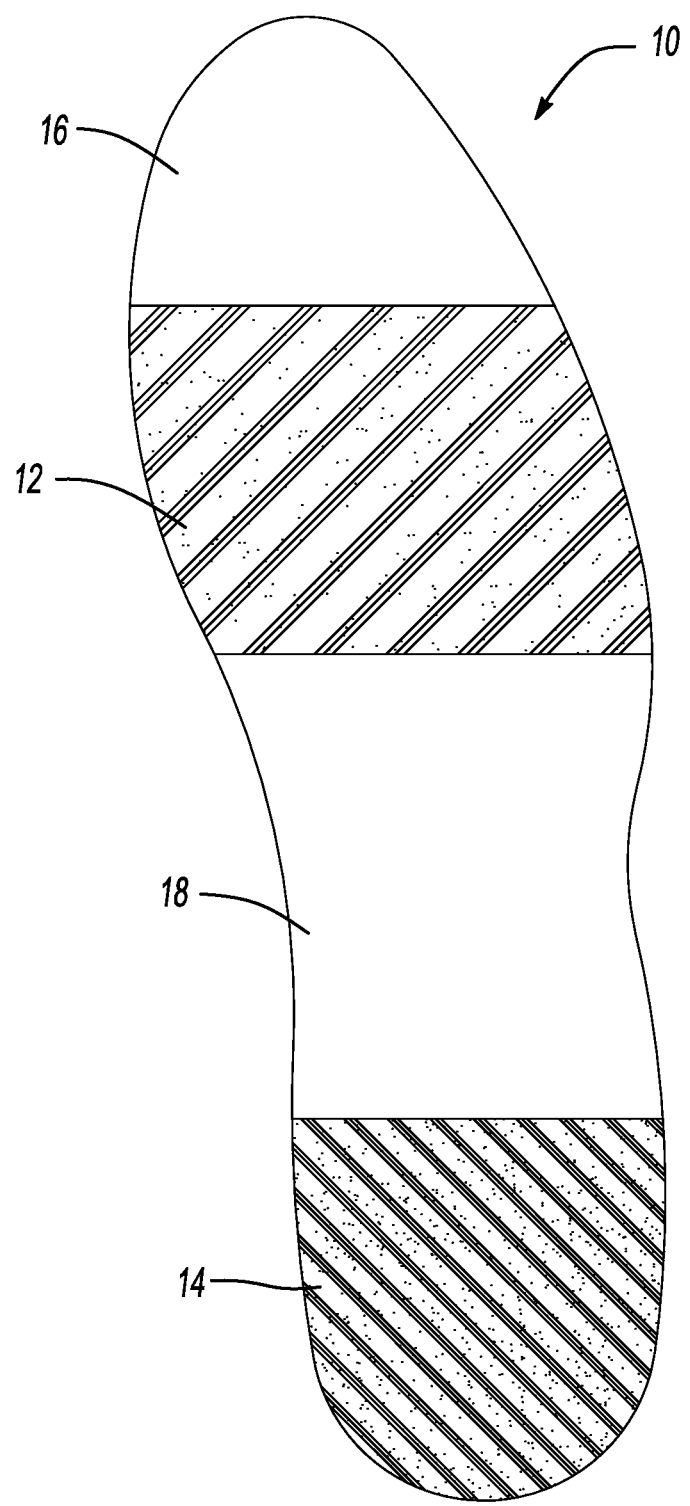

ARTICLE WITH CONTROLLED CUSHIONING

CROSS-REFERENCE TO RELATED APPLICATIONS

This application is a continuation of U.S. patent application Ser. No. 13/838,836, filed Mar. 15, 2013, which is hereby incorporated herein by reference in its entirety.

FIELD OF THE INVENTION

The invention is related to methods of making foams and elastomeric foams.

INTRODUCTION TO THE DISCLOSURE

This section provides background information related to this disclosure but which may or may not be prior art.

Polyurethane foams are typically prepared by using chemically acting blowing agents or physically acting blowing agents that are mixed into or injected into the monomer reactants during polymerization. Chemical blowing agents include compounds that form gaseous products by reaction with isocyanate, for example water or formic acid, while physical blowing agents are dissolved or emulsified in the monomers and vaporize under the conditions of polyurethane formation. These are, for example, hydrocarbons and halogenated hydrocarbons or gases such as carbon dioxide, which are introduced either on-line, i.e. directly into the mixing head, or via the stock tank in batch operation. Such a process is described, for instance, in Bruchmann et al., US Patent Application Publication No. US 2011/0275732.

Takemura et al., U.S. Pat. No. 6,878,753 describes shoe soles and midsoles made of a thermoset polyurethane foam. The foam is made by a process comprising mixing a polyol solution, which is previously prepared by mixing a polyol, with a catalyst, water and urea, a chain extender, and an additive as occasion demands, with a polyisocyanate compound with stirring in a molding machine; and injecting the resulting mixture into a mold and foaming the mixture. The density of a molded article of the polyurethane foam is said to be 0.15 to 0.45 g/cm$^3$.

Fischer et al., WO 94/20568, describes thermoplastic polyurethane mini-pellet or bead foams with an average diameter of 1-20 millimeters. The polyurethanes are polyester- and polyether-based materials. The bead foams are molded under pressure and heated by introducing pressurized steam.

Prissok et al, US Patent Application Publication No. 2010/0047550 describes a hybrid material with a matrix of polyurethane and foamed particles of thermoplastic polyurethane embedded in the matrix. The hybrid material may be used for making shoe soles. The matrix polyurethane may be foamed during molding.

Prissok et al., US Patent Application Publication No. 2010/0222442 describes an expandable thermoplastic polyurethane including a blowing agent and having a Shore hardness of A 44 to A 84. Foams can be produced from expanded beads of the polyurethane by fusing them to one another in a closed mold with exposure to heat. Prissok et al. teach that the beads are charged to the mold, the mold is closed, and steam or hot air is introduced into the mold to further expand the beads and fuse them together. A foam made in this way is said to have a density in the range of from 8 to 600 g/L.

Nadella, US Patent Application Publication No. US 2010/0052201 describes making foamed polymeric panels from solid monolithic semi-crystalline thermoplastic material sheets, such as polylactic acid, polyethylene terephthalate, polyethylene naphthalate, polybutylene terephthalate, polypropylene, and polyethylene. The disclosed applies to film-type materials.

A need remains for improved methods of forming foams that can be customized for cushioning in footwear, protective wear, and similar applications.

SUMMARY OF THE DISCLOSURE

This section provides a general summary of what this specification discloses.

In a disclosed method, pellets, beads, particles, or other pieces of a thermoplastic elastomer having a maximum size in at least one dimension of 10 mm or less are infused with a supercritical fluid in a pressurized container, then rapidly depressurized and heated either by immersion in a heated fluid that can rapidly heat the article or with infrared or microwave radiation to heat and foam the pellets, beads, particles, or other pieces. (The pellets, beads, particles, or other pieces will be collectively be called "pellets.") Foamed pellets of at least two different densities are made in this way by varying the pellets or the conditions for foaming the pellets. A mold for making a foamed article, for example a midsole, is divided into at least two regions. Pellets of a first density are placed in a first region and pellets of a second density are placed in a second region. Alternatively, pellets of a first composition are placed in a first region and pellets of a second composition are placed in a second region. The mold is filled and the pellets are molded into a midsole. The midsole for example may have a density in the first region that is different from the density in the second region. Foam response rates can also be adjusted by position in the footbed by using pellets of different composition or density or both in different areas.

In one aspect, the supercritical fluid comprises a polar liquid to adjust its Hildebrand solubility parameter to be nearer to that of the thermoplastic elastomer. Pellets are soaked in a first supercritical fluid comprising a first amount of the polar liquid and foamed to produce the pellets of the first density. Pellets are soaked in a second supercritical fluid comprising a second amount of the polar liquid and foamed to produce the pellets of the second density.

In another aspect, pellets are soaked in the supercritical fluid for different lengths of time, at different temperatures, or under different pressures to affect the amount of supercritical fluid infused into the pellets, which will result in foaming to different extents and produce foamed pellets of different densities.

In still another aspect, pellets of different densities are produced by immersing the pellets infused with a supercritical fluid in heated fluids of different temperatures or heating with different amounts of infrared or microwave radiation to cause different degrees of foaming.

In yet another aspect, pellets of different densities are produced by foaming differently sized pellets.

"A," "an," "the," "at least one," and "one or more" are used interchangeably to indicate that at least one of the item is present; a plurality of such items may be present unless the context clearly indicates otherwise. All numerical values of parameters (e.g., of quantities or conditions) in this specification, including the appended claims, are to be understood as being modified in all instances by the term "about" whether or not "about" actually appears before the numerical value. "About" indicates that the stated numerical value allows some slight imprecision (with some approach to exactness in the value; approximately or reasonably close to the value; nearly). If the imprecision provided by "about" is not otherwise understood in the art with this ordinary meaning, then "about" as used herein indicates at least variations that may arise from ordinary methods of measuring and using such parameters. In addition, disclosure of ranges are to be understood as specifically disclosing all values and further divided ranges within the range.

The terms "comprising," "including," and "having" are inclusive and therefore specify the presence of stated features, steps, operations, elements, or components, but do not preclude the presence or addition of one or more other features, steps, operations, elements, or components. Orders of steps, processes, and operations may be altered when possible, and additional or alternative steps may be employed. As used in this specification, the term "or" includes any one and all combinations of the associated listed items.

DRAWINGS

The drawings illustrate some aspects of the disclosed technology.

The FIGURE is a cross-section illustration of a midsole according to the invention.

DETAILED DESCRIPTION

This section provides specific examples intended to illustrate the invention that are not necessarily limiting as to materials and processes.

Pellets, beads, particles, or other pieces of a thermoplastic elastomer having a maximum size in at least one dimension of 10 mm or less (collectively, "pellets") are infused with a supercritical fluid in a pressurized container, then rapidly depressurized and heated either by immersion in a heated fluid or with infrared or microwave radiation to foam the pellets. The pellets are prepared with at least two different densities. Pellets may be pre- or post-treated with a binder to ensure that continuous parts are obtained after processing. Pellets with different densities or compositions are placed in different areas of a mold. The mold is filled with pellets and then heated to form a part. The part has areas of different density as a result of the placement of pellets of different density or areas of different foam response rates as a result of the placement of pellets of different compositions or densities.

Referring to the FIGURE, a cross-section of a midsole 10 molded by the method reveals distinct regions 12, 14, 16, and 18. The foam in region 12 has a low density. For example, the foam in region 12 may have a density of from about 0.1 to about 0.35 g/cm$^3$. The foam in region 14 has a comparatively higher density. As one example, the foam in region 14 may have a density that is from about 20% to about 50% higher than the density of the foam in the region 12. The foam in region 14 is relatively more dense because that region of the midsole, the heel, experiences more force than does the area under the ball of the foot during wear. The remaining regions 16, 18 may each independently have a foam density the same as the foam in one of the regions 12, 14 or may have still a different foam density. It may be preferred that the foam density be as low as possible in regions 16, 18 so that the midsole, and hence the shoe, is lighter for the wearer.

The foam pellets of different densities or different response rates may be color-coded by including dyes or pigments in the pellet compositions. They could be segregated by region or blended in various ratios to yield desired properties.

In a first step of the process, foamed pellets of different densities are produced.

The pellets that are foamed may have a regular or irregular shape, including generally spherical, cylindrical ellipsoidal, cubic, rectangular, and other generally polyhedral shapes as well as irregular or other shapes, including those having circular, elliptical, square, rectangular or other polygonal cross-sectional outer perimeter shapes or irregular cross-sectional shapes with or without uniform widths or diameters along an axis. "Generally" is used here to indicate an overall shape that may have imperfections and irregularities, such as bumps, dents, imperfectly aligned edges, corners, or sides, and so on.

The pellets may be of different sizes, but they have a maximum size in at least one dimension of 10 mm or less. Nonlimiting examples of suitable sizes include beads that are generally spherical with a diameter of from about 3 mm to about 8 mm and tablet-shaped or football-shaped pellets with a length of from about 3 mm to about 8 mm and a diameter of from about 1.5 mm to about 5 mm.

The pellets are made of a thermoplastic elastomer. Nonlimiting examples of suitable thermoplastic elastomers include thermoplastic polyurethane elastomers, thermoplastic polyurea elastomers, thermoplastic polyamide elastomers (PEBA or polyether block polyamides), thermoplastic polyester elastomers, metallocene-catalyzed block copolymers of ethylene and α-olefins having 4 to about 8 carbon atoms, and styrene block copolymer elastomers such as poly(styrene-butadiene-styrene), poly(styrene-ethylene-co-butylene-styrene), and poly(styrene-isoprene-styrene).

Thermoplastic polyurethane elastomers may be selected from thermoplastic polyester-polyurethanes, polyether-polyurethanes, and polycarbonate-polyurethanes, including, without limitation, polyurethanes polymerized using as polymeric diol reactants polyethers and polyesters including polycaprolactone polyesters. These polymeric diol-based polyurethanes are prepared by reaction of the polymeric diol (polyester diol, polyether diol, polycaprolactone diol, polytetrahydrofuran diol, or polycarbonate diol), one or more polyisocyanates, and, optionally, one or more chain extension compounds. Chain extension compounds, as the term is being used, are compounds having two or more functional groups reactive with isocyanate groups, such as the diols, amino alcohols, and diamines. Preferably the polymeric diol-based polyurethane is substantially linear (i.e., substantially all of the reactants are difunctional).

Diisocyanates used in making the polyurethane elastomers may be aromatic or aliphatic. Useful diisocyanate compounds used to prepare thermoplastic polyurethanes include, without limitation, isophorone diisocyanate (IPDI), methylene bis-4-cyclohexyl isocyanate ($H_{12}$MDI), cyclohexyl diisocyanate (CHDI), m-tetramethyl xylene diisocyanate (m-TMXDI), p-tetramethyl xylene diisocyanate (p-TMXDI), 4,4'-methylene diphenyl diisocyanate (MDI, also known as 4,4'-diphenylmethane diisocyanate), 2,4- or 2,6-toluene diisocyanate (TDI), ethylene diisocyanate, 1,2-diisocyanatopropane, 1,3-diisocyanatopropane, 1,6-diisocyanatohexane (hexamethylene diisocyanate or HDI), 1,4-butylene diisocyanate, lysine diisocyanate, meta-xylylenediioscyanate and para-xylylenediisocyanate, 4-chloro-1,3-phenylene diisocyanate, 1,5-tetrahydro-naphthalene diisocyanate, 4,4'-dibenzyl diisocyanate, and xylylene diisocyanate (XDI), and combinations of these. Nonlimiting examples of higher-functionality polyisocyanates that may be used in limited amounts to produce branched thermoplastic polyurethanes (optionally along with monofunctional alcohols or monofunctional isocyanates) include 1,2,4-benzene triisocyanate, 1,3,6-hexamethylene triisocyanate, 1,6,11-undecane triisocyanate, bicycloheptane triisocyanate, triphenylmethane-4,4',4"-triisocyanate, isocyanurates of diisocyanates, biurets of diisocyanates, allophanates of diisocyanates, and the like.

Nonlimiting examples of suitable diols that may be used as extenders include ethylene glycol and lower oligomers of ethylene glycol including diethylene glycol, triethylene glycol and tetraethylene glycol; propylene glycol and lower oligomers of propylene glycol including dipropylene glycol, tripropylene glycol and tetrapropylene glycol; cyclohexanedimethanol, 1,6-hexanediol, 2-ethyl-1,6-hexanediol, 1,4-butanediol, 2,3-butanediol, 1,5-pentanediol, 1,3-propanediol, butylene glycol, neopentyl glycol, dihydroxyalkylated aromatic compounds such as the bis (2-hydroxyethyl) ethers of hydroquinone and resorcinol; p-xylene-α,α'-diol; the bis (2-hydroxyethyl) ether of p-xylene-α,α'-diol; m-xylene-α,α'-diol and combinations of these. Thermoplastic polyurethanes may be made using small amounts of triols or higher functionality polyols, such as trimethylolpropane or pentaerythritol, optionally along with monomeric alcohols such as C2-C8 monools or monoisocyanates such as butyl isocyanate.

Useful active hydrogen-containing chain extension agents generally contain at least two active hydrogen groups, for example, diols, dithiols, diamines, or compounds having a mixture of hydroxyl, thiol, and amine groups, such as alkanolamines, aminoalkyl mercaptans, and hydroxyalkyl mercaptans, among others. The molecular weight of the chain extenders preferably range from about 60 to about 400. Alcohols and amines are preferred. Examples of useful diols include those diols already mentioned. Suitable diamine extenders include, without limitation, ethylene diamine, diethylene triamine, triethylene tetraamine, and combinations of these. Other typical chain extenders are amino alcohols such as ethanolamine, propanolamine, butanolamine, and combinations of these. The dithiol and diamine reactants may also be included in preparing polyurethanes that are not elastomeric.

In addition to difunctional extenders, a small amount of a trifunctional extender such as trimethylolpropane, 1,2,6-hexanetriol and glycerol, or monofunctional active hydrogen compounds such as butanol or dimethyl amine, may also be present. The amount of trifunctional extender or monofunctional compound employed may be, for example, 5.0 equivalent percent or less based on the total weight of the reaction product and active hydrogen containing groups used.

The polyester diols used in forming a thermoplastic polyurethane elastomer are in general prepared by the condensation polymerization of one or more polyacid compounds and one or more polyol compounds. Preferably, the polyacid compounds and polyol compounds are di-functional, i.e., diacid compounds and diols are used to prepare substantially linear polyester diols, although minor amounts of monofunctional, tri-functional, and higher functionality materials (perhaps up to 5 mole percent) can be included to provide a slightly branched, but uncrosslinked polyester polyol component. Suitable dicarboxylic acids include, without limitation, glutaric acid, succinic acid, malonic acid, oxalic acid, phthalic acid, hexahydrophthalic acid, adipic acid, maleic acid, suberic acid, azelaic acid, dodecanedioic acid, their anhydrides and polymerizable esters (e.g., methyl esters) and acid halides (e.g., acid chlorides), and mixtures of these. Suitable polyols include those already mentioned, especially the diols. In preferred embodiments, the carboxylic acid component includes one or more of adipic acid, suberic acid, azelaic acid, phthalic acid, dodecanedioic acid, or maleic acid (or the anhydrides or polymerizable esters of these) and the diol component includes one or more of includes 1,4-butanediol, 1,6-hexanediol, 2,3-butanediol, or diethylene glycol. Typical catalysts for the esterification polymerization are protonic acids, Lewis acids, titanium alkoxides, and dialkyltin oxides.

A polymeric polyether or polycaprolactone diol reactant for preparing thermoplastic polyurethanes may be obtained by reacting a diol initiator, e.g., 1,3-propanediol or ethylene or propylene glycol, with a lactone or alkylene oxide chain-extension reagent. Lactones that can be ring opened by an active hydrogen are well-known in the art. Examples of suitable lactones include, without limitation, ε-caprolactone, γ-caprolactone, β-butyrolactone, β-propriolactone, γ-butyrolactone, α-methyl-γ-butyrolactone, β-methyl-γ-butyrolactone, γ-valerolactone, δ-valerolactone, γ-decanolactone, δ-decanolactone, γ-nonanoic lactone, γ-octanoic lactone, and combinations of these. In one preferred embodiment, the lactone is δ-caprolactone. Useful catalysts include those mentioned above for polyester synthesis. Alternatively, the reaction can be initiated by forming a sodium salt of the hydroxyl group on the molecules that will react with the lactone ring.

In other embodiments, a diol initiator may be reacted with an oxirane-containing compound to produce a polyether diol to be used in the polyurethane elastomer polymerization. Alkylene oxide polymer segments include, without limitation, the polymerization products of ethylene oxide, propylene oxide, 1,2-cyclohexene oxide, 1-butene oxide, 2-butene oxide, 1-hexene oxide, tert-butylethylene oxide, phenyl glycidyl ether, 1-decene oxide, isobutylene oxide, cyclopentene oxide, 1-pentene oxide, and combinations of these. The oxirane-containing compound is preferably selected from ethylene oxide, propylene oxide, butylene oxide, tetrahydrofuran, and combinations of these. The alkylene oxide polymerization is typically base-catalyzed. The polymerization may be carried out, for example, by charging the hydroxyl-functional initiator compound and a catalytic amount of caustic, such as potassium hydroxide, sodium methoxide, or potassium tert-butoxide, and adding the alkylene oxide at a sufficient rate to keep the monomer available for reaction. Two or more different alkylene oxide monomers may be randomly copolymerized by coincidental addition or polymerized in blocks by sequential addition. Homopolymers or copolymers of ethylene oxide or propylene oxide are preferred. Tetrahydrofuran may be polymerized by a cationic ring-opening reaction using such counterions as $SbF_6^-$, $AsF_6^-$, $PF_6^-$, $SbCl_6^-$, $BF_4^-$, $CF_3SO_3^-$, $FSO_3^-$, and $ClO_4^-$. Initiation is by formation of a tertiary oxonium ion. The polytetrahydrofuran segment can be prepared as a "living polymer" and terminated by reaction with the hydroxyl group of a diol such as any of those mentioned above. Polytetrahydrofuran is also known as polytetramethylene ether glycol (PTMEG).

Aliphatic polycarbonate diols that may be used in making a thermoplastic polyurethane elastomer are prepared by the reaction of diols with dialkyl carbonates (such as diethyl carbonate), diphenyl carbonate, or dioxolanones (such as cyclic carbonates having five- and six-member rings) in the presence of catalysts like alkali metal, tin catalysts, or titanium compounds. Useful diols include, without limitation, any of those already mentioned. Aromatic polycarbonates are usually prepared from reaction of bisphenols, e.g., bisphenol A, with phosgene or diphenyl carbonate.

In various embodiments, the polymeric diol preferably has a weight average molecular weight of at least about 500, more preferably at least about 1000, and even more preferably at least about 1800 and a weight average molecular weight of up to about 10,000, but polymeric diols having weight average molecular weights of up to about 5000, especially up to about 4000, may also be preferred. The polymeric diol advantageously has a weight average molecular weight in the range from about 500 to about 10,000, preferably from about 1000 to about 5000, and more preferably from about 1500 to about 4000. The weight average molecular weights may be determined by ASTM D-4274.

The reaction of the polyisocyanate, polymeric diol, and diol or other chain extension agent is typically carried out at an elevated temperature in the presence of a catalyst. Typical catalysts for this reaction include organotin catalysts such as stannous octoate, dibutyl tin dilaurate, dibutyl tin diacetate, dibutyl tin oxide, tertiary amines, zinc salts, and manganese salts. Generally, for elastomeric polyurethanes, the ratio of polymeric diol, such as polyester diol, to extender can be varied within a relatively wide range depending largely on the desired hardness of the final polyurethane elastomer. For example, the equivalent proportion of polyester diol to extender may be within the range of 1:0 to 1:12 and, more preferably, from 1:1 to 1:8. Preferably, the diisocyanate(s) employed are proportioned such that the overall ratio of equivalents of isocyanate to equivalents of active hydrogen containing materials is within the range of 1:1 to 1:1.05, and more preferably, 1:1 to 1:1.02. The polymeric diol segments typically are from about 35% to about 65% by weight of the polyurethane polymer, and preferably from about 35% to about 50% by weight of the polyurethane polymer.

The selection of diisocyanate, extenders, polymeric diols, and the weight percent of the polymeric diols used takes into account the desired density and stability of the finished foam. In general, a greater content of a polymeric polyol that has a Hildenbrand solubility parameter closer to that of the supercritical fluid will permit higher absorption of the supercritical fluid that results in a lower density foam. Also in general, shorter polymeric diols provide foams that shrink less after they are first foamed. Use of higher number average molecular weight polymeric diols allow a higher degree of swelling, but a molecular weight that is too high may yield a less stable foam.

Suitable thermoplastic polyurea elastomers may be prepared by reaction of one or more polymeric diamines or polyols with one or more of the polyisocyanates already mentioned and one or more diamine extenders. Nonlimiting examples of suitable diamine extnders include ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), N-(3-aminopropyl)-N-methyl-1,3-propanediamine), 1,4-bis(3-aminopropoxy)butane, diethyleneglycol-di(aminopropyl)ether), 1-methyl-2,6-diamino-cyclohexane, 1,4-diamino-cyclohexane, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, N,N'-dialkylamino-dicyclohexylmethane, and 3,3'-diethyl-5,5'-dimethyl-4,4'-diamino-dicyclohexylmethane. Polymeric diamines include polyoxyethylene diamines, polyoxypropylene diamines, poly(oxyethylene-oxypropylene) diamines, and poly(tetramethylene ether) diamines. The amine- and hydroxyl-functional extenders already mentioned may be used as well. Generally, as before, trifunctional reactants are limited and may be used in conjunction with monofunctional reactants to prevent crosslinking.

Suitable thermoplastic polyamide elastomers may be obtained by: (1) polycondensation of (a) a dicarboxylic acid, such as oxalic acid, adipic acid, sebacic acid, terephthalic acid, isophthalic acid, 1,4-cyclohexanedicarboxylic acid, or any of the other dicarboxylic acids already mentioned with (b) a diamine, such as ethylenediamine, tetramethylenediamine, pentamethylenediamine, hexamethylenediamine, or decamethylenediamine, 1,4-cyclohexanediamine, m-xylenediamine, or any of the other diamines already mentioned; (2) a ring-opening polymerization of a cyclic lactam, such as δ-caprolactam or ω-laurolactam; (3) polycondensation of an aminocarboxylic acid, such as 6-aminocaproic acid, 9-aminononanoic acid, 11-aminoundecanoic acid, or 12-aminododecanoic acid; or (4) copolymerization of a cyclic lactam with a dicarboxylic acid and a diamine to prepare a carboxylic acid-functional polyamide block, followed by reaction with a polymeric ether diol (polyoxyalkylene glycol) such as any of those already mentioned. Polymerization may be carried out, for example, at temperatures of from about 180° C. to about 300° C. Specific examples of suitable polyamide blocks include NYLON 6, NYLON 66, NYLON 610, NYLON 11, NYLON 12, copolymerized NYLON, NYLON MXD6, and NYLON 46.

The effects of the type and molecular weights of the soft segment polymeric polyols used in making thermoplastic polyurea elastomers and polyamide elastomers are analogous to the same effects in making thermoplastic polyurethane elastomers.

Thermoplastic polyester elastomers have blocks of monomer units with low chain length that form the crystalline regions and blocks of softening segments with monomer units having relatively higher chain lengths. Thermoplastic polyester elastomers are commercially available under the tradename HYTREL from DuPont.

Metallocene-catalyzed block copolymers of ethylene and α-olefins having 4 to about 8 carbon atoms are prepared by single-site metallocene catalysis of ethylene with a softening comonomer such as hexane-1 or octene-1, for example in a high pressure process in the presence of a catalyst system comprising a cyclopentadienyl-transition metal compound and an alumoxane. Octene-1 is a preferred comonomer to use. These materials are commercially available from ExxonMobil under the tradename Exact™ and from the Dow Chemical Company under the tradename Engage™.

Styrene block copolymer elastomers such as poly(styrene-butadiene-styrene), poly(styrene-ethylene-co-butylene-styrene), and poly(styrene-isoprene-styrene) may be prepared may anionic polymerization in which the polymer segments are produced sequentially, first by reaction of an alkyl-lithium initiator with styrene, then continuing polymerization by adding the alkene monomer, then completing polymerization by again adding styrene. S-EB-S and S-EP-S block copolymers are produced by hydrogenation of S-B-S and S-I-S block copolymers, respectively.

The thermoplastic elastomers are formed into the pellets, beads, particles, or other pieces having a maximum size in at least one dimension of 10 mm or less by known methods, such as extrusion and cutting or pelletizing.

The pellets are infused with a supercritical fluid, which in many embodiments is preferably supercritical carbon dioxide.

Nonlimiting examples of suitable compounds that can be used as the supercritical fluid include carbon dioxide (critical temperature 31.1° C., critical pressure 7.38 MPa), nitrous oxide (critical temperature 36.5° C., critical pressure 7.24 MPa), ethane (critical temperature 32.3° C., critical pressure 4.88 MPa), ethylene (critical temperature 9.3° C., critical pressure 5.12 MPa), nitrogen (critical temperature −147° C., critical pressure 3.39 MPa), and oxygen (critical temperature −118.6° C., critical pressure 5.08 MPa).

Supercritical fluids may be used in combination. In some cases, supercritical nitrogen may be used as a nucleating agent in a small weight percentage along with supercritical carbon dioxide or another supercritical fluid that acts as the blowing agent. Nano-sized particles such as nano clays, carbon black, crystalline, immiscible polymers, and inorganic crystals such as salts can be included as nucleating agents.

Carbon dioxide is often used as a supercritical fluid in different processes. The supercritical carbon dioxide fluid can be made more compatible with the polar thermoplastic elastomers (particularly thermoplastic polyurethane, polyurea, and polyamide elastomers) by mixing it with a polar fluid such as methanol, ethanol, propanol, or isopropanol. The polar fluid that is used should have a Hildebrand solubility parameter equal to or greater than 9 $MPa^{-1/2}$. Increasing the weight fraction of the polar fluid increases the amount of carbon dioxide uptake, but the polar fluid is also taken up, and at some point there is a shift from a maximum amount of uptake of the supercritical carbon dioxide to an increasing amount of the non-foaming agent polar fluid being taken up by the thermoplastic elastomer article. In certain embodiments, from about 0.1 mole % to about 7 mole % of the polar fluid is included in the supercritical fluid, based on total fluid, especially when used to infuse a polyurethane elastomer, polyurea elastomer, or a polyamide elastomer.

The articles are placed in a vessel that can withstand high pressure. The vessel is closed and $CO_2$ or other type of foaming agent is introduced. The vessel temperature and pressure are maintained above the critical temperature and pressure of the foaming agent. Once the article is saturated with the foaming agent, the vessel is rapidly depressurized (the depressurizing process can last up to a minute or so). The article is then removed from the vessel and heated to produce the foamed part. When a co-solvent is used, it can be introduced along with the $CO_2$ or added to the vessel with the article before the vessel is closed.

The thermoplastic article is soaked in the supercritical fluid under conditions—temperature and pressure—and for a time to allow it to take up a desired amount of the supercritical fluid. In a first way of preparing pellets of different densities, at least two groups of pellets are soaked in the supercritical fluid for different lengths of time, at different temperatures, or under different pressures to affect the amount of supercritical fluid infused into the pellets, which will result in foaming to different extents and thus produce foamed pellets of different densities. For example, one group may be soaked under conditions or for a period of time to saturate the pellets, while the other group of pellets are not fully saturated by the supercritical fluid.

In another embodiment, one group of pellets may be partially infused with a non-foaming liquid before being soaked in the supercritical fluid. The amount of the non-foaming liquid imbibed by the pellets prevents this group of pellets from taking up as much of the critical fluid as a second group of pellets that has not been infused with the non-foaming liquid.

In still another embodiment, at least two groups of pellets, with each group having pellets of different sizes, are soaked in the supercritical fluid.

In yet another embodiment, at least two groups of pellets are soaked in supercritical fluid, each in a different formulation of the supercritical fluid, where the formulations differ in the amount of polar fluid included in the supercritical fluid or in the type of polar fluid included in the supercritical fluid (for example, the polar fluid in each different formulation has a different Hildebrand solubility parameter).

After soaking in the supercritical fluid, the pellets are removed from the chamber and immediately either heated to a temperature in a medium with suitable thermal characteristics for foaming to occur or is exposed to microwaves or infrared radiation in a tunnel or oven to cause the foaming to occur. In microwave heating, the material is exposed to an electromagnetic wave that causes the molecules in the material to oscillate, thereby generating heat. The system can be designed to work in batch or continuous process. In a batch process, the articles saturated with the supercritical fluid are placed in a microwave oven or a device equipped with an IR lamp or IR lamps. Preferably the articles are rotated or agitated, when their size is small enough, to ensure fast and uniform heating. When foaming is completed, the articles are removed from the system. The heating can also be done in the continuous process. The articles are placed on a planar surface such as a belt that moves them through a tunnel or through a pipe. The system is designed so that the heating elements (IR lamp or microwave generator) can apply power to achieve rapid uniform heating. The time of heating is controlled by the speed by which the articles move through the tunnel or pipe.

In a further way of making foamed pellets of different densities, different groups of pellets are exposed to the microwave or infrared radiation for different lengths of time so that they are foamed to different extents.

Water is one suitable medium in which foaming readily occurs at an appropriate temperature because water has a high heat capacity and heat transfer rate. In certain preferred embodiments, the thermoplastic elastomer article infused or saturated with supercritical fluid is submerged in water that is at a temperature at least about 80° higher and, preferably, at least about 100° higher than the elastomer's (soft segment) $T_g$ but less than the elastomer's (hard segment) $T_m$.

In another way of making foamed pellets of different densities, different groups of pellets are submerged in water baths at different temperatures so that they are foamed to different extents.

Other suitable mediums are steam or pressurized hot air. Different groups of pellets may be exposed to hot gases such as the steam or air that are at different temperatures or for different lengths of time so that they are foamed to different extents.

In another embodiment, a delay for from about several minutes to about a day allows at least part of the absorbed supercritical fluid to desorb without foaming. In this way, there will be a gradient concentration of the supercritical fluid in the pellet, with a lower concentration in an outer layer of the pellet and a higher density in the center of the pellet. Such a gradient affects the density and foam response rate.

Time, temperature, and pressure in the step of solvating the thermoplastic elastomer article with the supercritical fluid and the depressurization rate, temperature, and medium in the foaming step all affect the degree of foaming achieved. In general, larger pellets must be kept in the supercritical fluid for a longer time to become saturated with the supercritical fluid. Another method of preparing pellets of different densities is to carry out the foaming process in the same way for groups of differently-sized pellets, where only one group of the pellets is saturated by the supercritical fluid or is infused with a larger amount of the supercritical fluid than is the other group.

The foamed pellets may be annealed at an elevated temperature after the foaming process before they are molded. While not wishing to be bound by theory, it is believed that annealing the article may allow phase segregation of the elastomers that are placed under strain, e.g. the mold, and stress, a partial pressure external to moderate internal pressure equilibration just after rapid foaming. Cooling under balanced forces allow the increased modulus to maintain shape once at room temperature and atmospheric pressure.

The pellets may be annealed at a temperature from above ambient to just below the $T_m$ of the thermoplastic elastomer (which may be determine by the usual appropriate thermal methods, of which differential scanning calorimetry (DSC) may be mentioned) for a time sufficient to stabilize the foam.

Foam response rates can also be adjusted by position in the footbed by using pellets of different composition or density or both in different areas.

A mold is filled with the foamed pellets of different densities, which are segregated into a plurality of different areas in the mold. Pellets of at least two different densities are used, and more may be used.

After the mold is filled in this way, the pellets are molded at an appropriate temperature into a shaped article. The shaped article may be of any dimensions. For example, the molded article may be sized as a cushion or cushioning element that can be included in an article of footwear, for example part of a footwear upper, such as a foam element in a collar or tongue, as an insole, as a midsole or a part of a midsole, or an outsole or a part of an outsole; foam padding in shinguards, shoulder pads, chest protectors, masks, helmets or other headgear, knee protectors, and other protective equipment; an element placed in an article of clothing between textile layers; in clothing, in protective gear such as helmets, chest protectors, and shoulder pads, or may be used for other known padding applications for protection or comfort, especially those for which weight of the padding is a concern.

In one embodiment, a foamed article, such as a midsole for footwear, is formed by placing desired amount of thermoplastic polyurethane foamed pellets of different densities, compositions, or foam response rates, for example arranged generally as shown in the FIGURE, in a compression mold in the shape of the article and the mold is brought to a peak temperature of from about 100° C. to about 180° C. over a period of from about 300 to about 1500 seconds, then cooled to from about 5° C. to about 80° C. over a period of from about 300 to about 1500 seconds within about 30 seconds after the peak temperature is reached. In various embodiments, the thermoplastic polyurethane foam pellets may preferably be generally spherical or ellipsoidal. In the case of non-spherical pellets, for example ellipsoidal beads, the largest major diameter of a cross-section taken perpendicular to the major (longest) axis of the ellipsoid. The foam pellets may preferably have a diameter of from about 0.5 mm to about 1.5 cm. Ellipsoidal pellets may be from about 2 mm to about 20 mm in length and from about 1 to about 20 mm in diameter. Each individual pellet may be, for example, from about 20 to about 45 mg in weight. The foam pellets may have a density of from about 0.01 to about 0.3 g/cm$^3$ and the molded article may have a density from about 0.1 to about 0.45 g/cm$^3$.

A desired amount of the thermoplastic polyurethane foam pellets are placed in the compression mold. The foamed pellets may be placed in the mold when both the mold and the foamed pellets are at a temperature below about 80° C. Preferably, the temperatures of the mold and of the foamed beads are both ambient temperature (about 5-27° C.), although as mentioned the temperatures of each may be higher, up to perhaps 80° C.

The foam pellets may be coated with an adhesive before being placed in the mold. Suitable adhesives include W-104, W-105, W-01, W-01S and SW07 from Henkel. Other adhesives such as WA-1C and WP1-116K from Han Young Industry Company can also be used. In general, these adhesives may be sprayed onto the foamed pellets or otherwise coated onto the foamed pellets.

The mold is brought to a peak temperature that is in the range of up about 110° C. over a period of from about 300 to about 1500 seconds. In general, a longer time may be used for heating a thicker part to mold the part. Thus, a thicker part may be brought to the peak molding temperature over a longer period of time compared to the time in which a thinner part is brought to the peak molding temperature. In various embodiments, the mold is brought to the peak temperature over a period of from about 300 to about 1200 seconds or from about 300 to about 900 seconds. A desired skin thickness may be achieved by selection of the maximum heating temperature within the temperature range. Skin thickness may be selected to alter cushioning and feel of a molded midsole as used in an article of footwear. The skin thickness on a bead may be about 10 micrometers. The skin thickness on a molded part may be at least about 20 micrometers. In various embodiments, the peak temperature is selected to produce a skin thickness of from about 10 to about 200 micrometers.

The mold is then cooled to a temperature of from about 5° C. to about 80° C. over a period of from about 300 to about 1500 seconds. Cooling is typically carried out by moving the mold to the cold side of the compression molding press between two cold plates. In general, a longer time may be used for cooling a thicker part.

In other embodiments, the foamed pellets are molded with a matrix material of an unfoamed thermoplastic elastomer, which may include a blowing agent so that it is foamed during the molding process.

The molded article may be used as an insert in a further molding process, such as in a thermoforming process.

The foregoing description of the embodiments has been provided for purposes of illustration and description. It is not intended to be exhaustive or to limit the invention. Individual elements or features of a particular embodiment are generally not limited to that particular embodiment, but can be used in other embodiments and can be combined in other ways, even if not specifically shown or described. Such variations are included in the invention.

What is claimed is:

1. A molded article made by a process comprising
   placing foamed pellets of different densities in a plurality of different areas of a mold; and
   molding the foamed pellets of different densities pellets to form the molded article;
   wherein the foamed pellets of different densities are annealed supercritical fluid-foamed pellets comprising a thermoplastic elastomer and have a density from about 0.01 to about 0.3 g/cm$^3$;

wherein the molded article has a density from about 0.1 to about 0.45 g/cm$^3$;

wherein the molded article has a second region with a higher density than a first region; and wherein the molded article has a skin thickness of about 20 micrometers.

2. The molded article according to claim 1, wherein the foamed pellets of different densities are foamed pellets formed by infusing unfoamed thermoplastic elastomer pellets with a supercritical fluid in a pressurized container, removing the infused thermoplastic elastomer pellets from the container, and (i) heating the infused thermoplastic pellets in a medium with suitable thermal characteristics for foaming to occur or (ii) irradiating the infused thermoplastic pellets with infrared or microwave radiation for foaming to occur, thereby foaming the infused thermoplastic elastomer pellets.

3. The molded article according to claim 1, wherein the thermoplastic elastomer of the foamed pellets of different densities comprise a thermoplastic polyurethane.

4. The molded article according to claim 2, wherein the supercritical fluid is supercritical carbon dioxide.

5. The molded article according to claim 1, wherein the molded article is a midsole for an article of footwear.

6. The molded article according to claim 5, wherein the first region is located in an area of the midsole under the ball of the foot and the second region is located in a heel area of the midsole.

7. The molded article according to claim 1, wherein the mold is brought to a peak temperature of from about 100° C. to about 180° C. over a period of from about 300 to about 1500 seconds, then cooled to from about 5° C. to about 80° C. over a period of from about 300 to about 1500 seconds within about 30 seconds after the peak temperature is reached.

8. The molded article according to claim 1, wherein the foamed pellets of different densities have a maximum size of 10 mm or less in at least one dimension.

9. The molded article according to claim 1, wherein the second region has a density that is from about 20% to about 50% higher than the density in the first region.

10. A molded article made by a process comprising placing foamed pellets of different densities in a plurality of different areas of a mold; and molding the foamed pellets of different densities to form the molded article;

wherein the foamed pellets of different densities are made by a process comprising infusing unfoamed thermoplastic elastomer pellets with a supercritical fluid in a pressurized container, removing the infused thermoplastic elastomer pellets from the container, and foaming the pellets by one of (i) heating the infused thermoplastic elastomer pellets in a medium with suitable thermal characteristics for foaming to occur or (ii) irradiating the infused thermoplastic elastomer pellets with infrared or microwave radiation for foaming to occur, making supercritical fluid-foamed thermoplastic elastomer pellets, and annealing the supercritical fluid-foamed thermoplastic elastomer pellets at a temperature from above ambient to just below the $T_m$ of the thermoplastic elastomer;

wherein the foamed pellets of different densities have a density from about 0.01 to about 0.3 g/cm$^3$;

wherein the molded article has a density from about 0.1 to about 0.45 g/cm$^3$;

wherein the molded article has a second region with a higher density than a first region; and wherein the molded article has a skin thickness of about 20 micrometers.

11. The molded article according to claim 10, wherein the molded article is a midsole.

12. The molded article according to claim 10, wherein the mold is brought to a peak temperature of from about 100° C. to about 180° C. over a period of from about 300 to about 1500 seconds, then cooled to from about 5° C. to about 80° C. over a period of from about 300 to about 1500 seconds within about 30 seconds after the peak temperature is reached.

13. The molded article according to claim 10, wherein the foamed pellets of different densities have a maximum size of 10 mm or less in at least one dimension.

14. The molded article according to claim 10, wherein the thermoplastic elastomer of the foamed pellets of different densities comprise a thermoplastic polyurethane.

15. The molded article according to claim 10, wherein the second region has a density that is from about 20% to about 50% higher than the density in the first region.

* * * * *